(12) United States Patent
Wheeler

(10) Patent No.: US 8,887,900 B2
(45) Date of Patent: Nov. 18, 2014

(54) RAIL CONVEYOR SYSTEM

(75) Inventor: Craig Anthony Wheeler, New South Wales (AU)

(73) Assignee: Newcastle Innovation Limited (AU)

( * ) Notice: Subject to any disclaimer, the term of this patent is extended or adjusted under 35 U.S.C. 154(b) by 30 days.

(21) Appl. No.: 13/811,652

(22) PCT Filed: Jul. 25, 2011

(86) PCT No.: PCT/AU2011/000930
§ 371 (c)(1),
(2), (4) Date: Jan. 22, 2013

(87) PCT Pub. No.: WO2012/009765
PCT Pub. Date: Jan. 26, 2012

(65) Prior Publication Data
US 2013/0118371 A1    May 16, 2013

(30) Foreign Application Priority Data

Jul. 23, 2010 (AU) ................................ 2010903316
Oct. 5, 2010 (AU) ................................ 2010904465

(51) Int. Cl.
| | | |
|---|---|---|
| B65G 15/08 | (2006.01) | |
| B61D 11/00 | (2006.01) | |
| B61B 13/04 | (2006.01) | |
| B65G 17/02 | (2006.01) | |
| B65G 21/22 | (2006.01) | |
| E21F 13/08 | (2006.01) | |
| B61D 11/02 | (2006.01) | |
| B65G 39/20 | (2006.01) | |
| B61B 9/00 | (2006.01) | |

(52) U.S. Cl.
CPC . *B61B 9/00* (2013.01); *B61B 13/04* (2013.01); *B65G 17/02* (2013.01); *B65G 21/22* (2013.01); *E21F 13/083* (2013.01); *B61D 11/02* (2013.01); *B65G 39/20* (2013.01)
USPC ........ 198/832; 198/799; 198/833; 104/173.1; 104/178; 104/189

(58) Field of Classification Search
CPC ......... B65G 17/002; E01B 25/14; E02F 3/46; B61B 13/12; B61B 9/00
USPC ...................... 104/118, 119, 173.1, 178, 189; 198/799, 832, 833; 280/62, 477, 480; 414/339
See application file for complete search history.

(56) References Cited

U.S. PATENT DOCUMENTS 2,115,095 A * 4/1938 Bugatti ........................... 105/4.1
3,381,799 A * 5/1968 Havelka ......................... 198/823

(Continued)

FOREIGN PATENT DOCUMENTS

| GB | 816978 | 7/1959 |
| JP | 56122708 | 9/1981 |

(Continued)

OTHER PUBLICATIONS

"PCT/AU2011/000930 International Preliminary Report on Patentability", Jun. 26, 2012.

*Primary Examiner* — Douglas Hess
(74) *Attorney, Agent, or Firm* — Kilpatrick Townsend & Stockton LLP

(57) ABSTRACT

A rail conveyor system combining the low friction attributes of railway transportation with the continuous bulk handling advantages of belt conveyors, uses a multiplicity of spaced carriages running on steel wheels on rail tracks to support a continuous carry belt. The system is driven by various means including a rope extending between the carriages. Various other drive means including drive belt technology are also described along with loading and unloading stations and distributed drive stations.

16 Claims, 19 Drawing Sheets

(56) References Cited

U.S. PATENT DOCUMENTS

| | | | | |
|---|---|---|---|---|
| 4,471,700 | A | * | 9/1984 | Prins .............................. 105/4.4 |
| 4,615,434 | A | * | 10/1986 | Lachmann ................... 198/823 |
| 4,957,405 | A | | 9/1990 | Roberts et al. |
| 5,400,898 | A | * | 3/1995 | Weber .......................... 198/792 |
| 5,868,193 | A | * | 2/1999 | Luginbuhl et al. ............ 164/430 |
| 5,881,832 | A | * | 3/1999 | Zitz et al. ..................... 180/169 |
| 6,397,756 | B1 | * | 6/2002 | Saiko et al. .................... 104/53 |
| 7,004,077 | B2 | * | 2/2006 | Meindl ....................... 104/173.1 |
| 7,032,744 | B1 | * | 4/2006 | Pietsch .......................... 198/819 |
| 7,500,552 | B2 | * | 3/2009 | Switzeny ....................... 198/686 |

FOREIGN PATENT DOCUMENTS

| | | |
|---|---|---|
| RU | 546521 | 2/1977 |
| RU | 570518 | 9/1977 |

* cited by examiner

RAIL CONVEYOR SYSTEM

PRIOR RELATED APPLICATIONS

The present application is the U.S. National phase of PCT/AU2011/000930 filed Jul. 25, 2011 which claims priority to Australian Patent Application No. 2010903316 filed Jul. 23, 2010 and Australian Patent Application No. 2010904465 filed Oct. 5, 2010, each of which is incorporated herein by reference in its entirety.

FIELD OF THE INVENTION

This invention relates to a rail conveyor system and has been devised particularly though not solely for transporting bulk materials over distances in the order of 10 to 100 kilometers.

BACKGROUND OF THE INVENTION

In the past, belt conveyors have typically been used to convey bulk materials over distances of up to 20 kilometers. Such bulk materials would typically include coal, iron ore, bauxite etc. Transportation distances vary considerably depending on operational requirements but much of this bulk material is presently transported many tens, or even hundreds of kilometers to the processing plant, power station or export terminal. The choice of bulk handling system depends on the transportation distance, throughput and terrain, and in most cases will rely on belt conveyors, in combination with haul trucks and/or railway systems.

Increasing fuel prices and the need to lower greenhouse gas emissions, coupled with the increasing demand for minerals, has seen considerable pressure to maximise the efficiency and economy of overland bulk material transportation systems.

Belt conveyors being continuous, rather than a batch transportation system are used wherever they are technically and economically feasible. Additionally, with the demand for automated mining operations, belt conveyors have clear operational advantages. However, due to the inherent motion losses of transportation, the rolling resistance of a belt conveyor is greater than both trucks and railway. These losses effectively limit the operational length of conventional belt conveyors. If belt conveyors were able to transport more efficiently they could transport over longer distances due to reduced cumulative belt tension, and thus compete more favourably with trucks and even railway.

Belt conveyors are typically more economically feasible than trucks up to distances of 25 km, while in some instances this may extend up to 100 km. By comparison, railway systems tend to be more economically feasible for distances greater than 100 km, primarily due to the significant infrastructure costs.

There is therefore a need to provide a more energy efficient and cost effective method for transporting bulk commodities over long distances.

SUMMARY OF THE INVENTION

Accordingly, the present invention provides a rail conveyor system including a rail track, a plurality of carriages spaced apart from one another and arranged to run on wheels supported by the track, and a continuous carry belt supported by the carriages.

Preferably, the track is a steel rail track.

Preferably, the wheels are steel wheels arranged to run on the track.

In one form of the invention the steel wheels of the invention are flanged and engage with pairs of rails in a similar manner to a conventional railway system.

Preferably, the carriages are spaced apart and connected together by a driving rope, or ropes, driven by drive means to pull the carriages along the track.

Alternatively, the carriages are spaced apart and connected together by a rope, and driven by the carry belt.

In one form of the invention, the conveyor is driven entirely by the driving rope or belt.

In an alternative form of the invention, the conveyor may be partially or wholly driven by linear motors spaced apart along the track and operable on the carriages.

In yet a further form of the invention, the continuous carry belt is driven by one or more drive belts.

Preferably, the continuous carry belt sits upon the, or each, drive belt and is driven by friction between the drive belt and the continuous carry belt.

In one form of the invention the drive belt comprises a V-belt.

Preferably, the V-belt comprises a multiple V-belt.

In an alternative form of the invention the drive belt comprises a wire rope.

In some applications, the, or each, drive belt is driven and tensioned by distributed drive stations spaced at intervals along the length of the track.

When pairs of rails are used, the carry belt is preferably lifted from the carriages at a head drive station, allowing material to be discharged from the carry belt while the carriages are directed around a return loop before being reunited with the carry belt.

Preferably, a loading chute is provided arranged to direct material on to the carry belt, and a plurality of closely spaced idler rollers are provided beneath the carry belt in the vicinity of the loading chute.

In some embodiments of the invention, pairs of steel wheels in each carriage are connected by a live axle.

In an alternative form of the invention, the track comprises a monorail track and idler rollers are provided depending downwardly from each carriage to engage the side of the monorail track.

BRIEF DESCRIPTION OF THE DRAWINGS

Notwithstanding any other forms that may fall within its scope, one preferred form of the invention will now be described by way of example only with reference to the accompanying drawings in which.

PREFERRED EMBODIMENTS OF THE INVENTION

Figure 1:
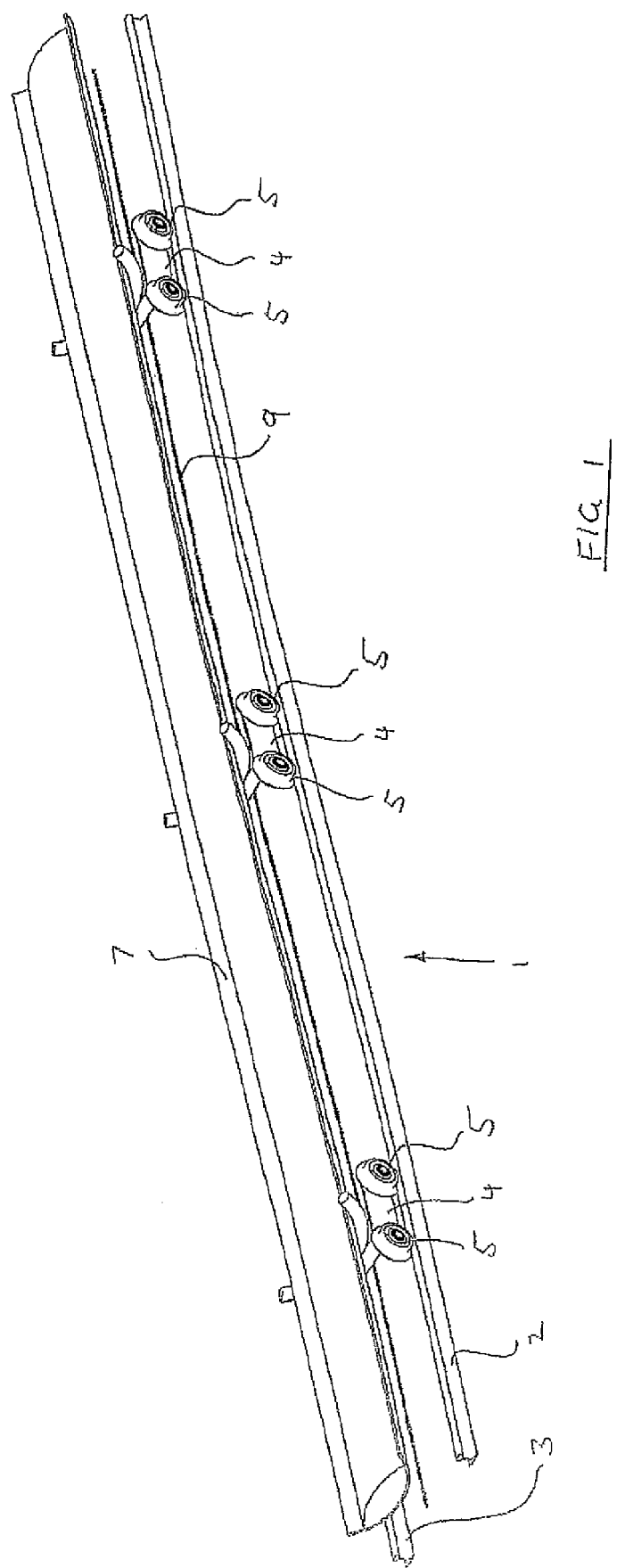
FIG. 1 is a diagrammatic perspective view of a short length of a rail conveyor system according to the invention.

In one preferred form of the invention, the rail conveyor system is formed by providing a rail track 1 which typically incorporates two side-by-side conventional rails 2 and 3. These rails may be of a similar type to that used in conventional train rail tracks and may either be mounted on the ground on sleepers as for a conventional rail track system or elevated and supported on frames as is well-known for typical belt conveyor systems.

The system further comprises a plurality of carriages 4 spaced apart from one another and running on wheels 5 supported by the tracks 2 and 3.

Figure 2:
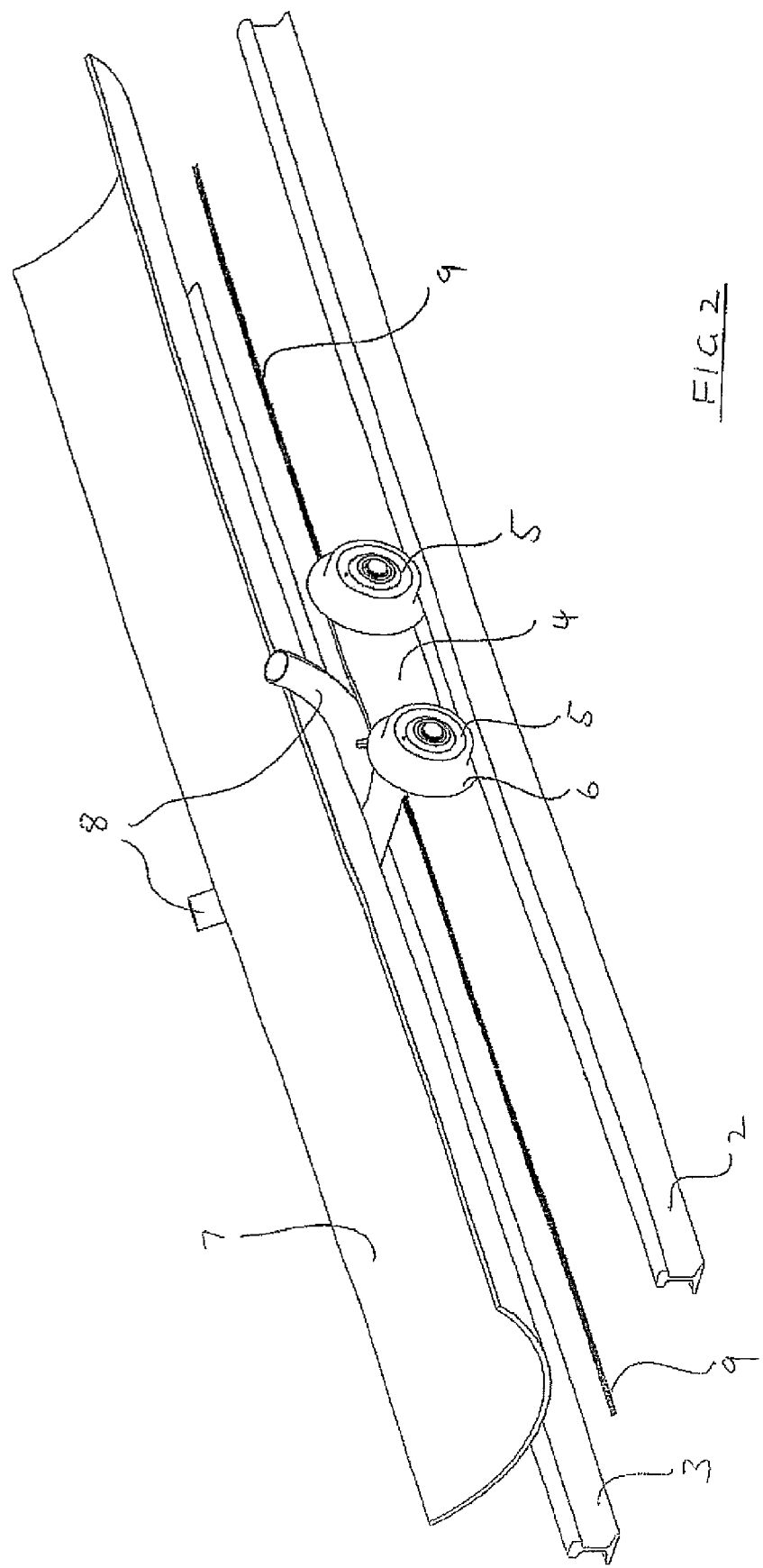
FIG. 2 is a partial view of FIG. 1 to an enlarged scale.

As can be more clearly seen in FIG. 2, the wheels are typically flanged as can be seen at 6 and engage the inside edges of the rails 2 and 3 in a similar manner to a conventional train system.

The rail conveyor system according to the invention further incorporates a continuous carry belt 7 which is supported by the carriages 4, typically by being carried in a suitably shaped yolk 8 mounted on each carriage.

Although it is possible to connect and drive the carriages 4 solely by their attachment, either by rigid connection or by friction to the carry belt 7, in one preferred form of the invention the carriages 4 are spaced apart and connected together by a driving rope 9. The driving rope is typically a steel rope, or ropes driven by drive means as will be described further below.

Figure 3:
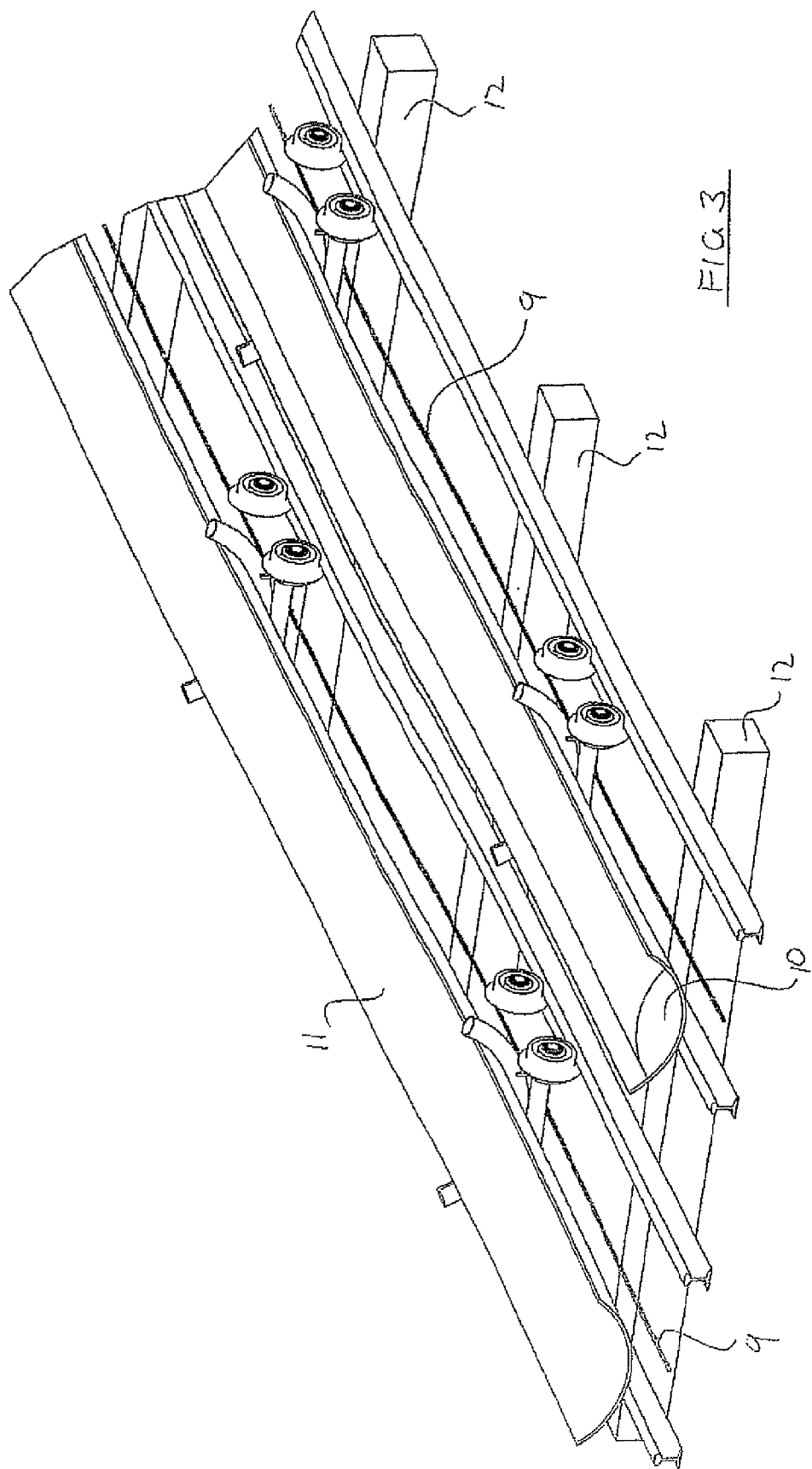
FIG. 3 is a similar view to FIG. 1 showing two parallel rail tracks for the conveying and return sections of the conveyor system mounted side-by-side on a common set of sleepers.
Figure 17:
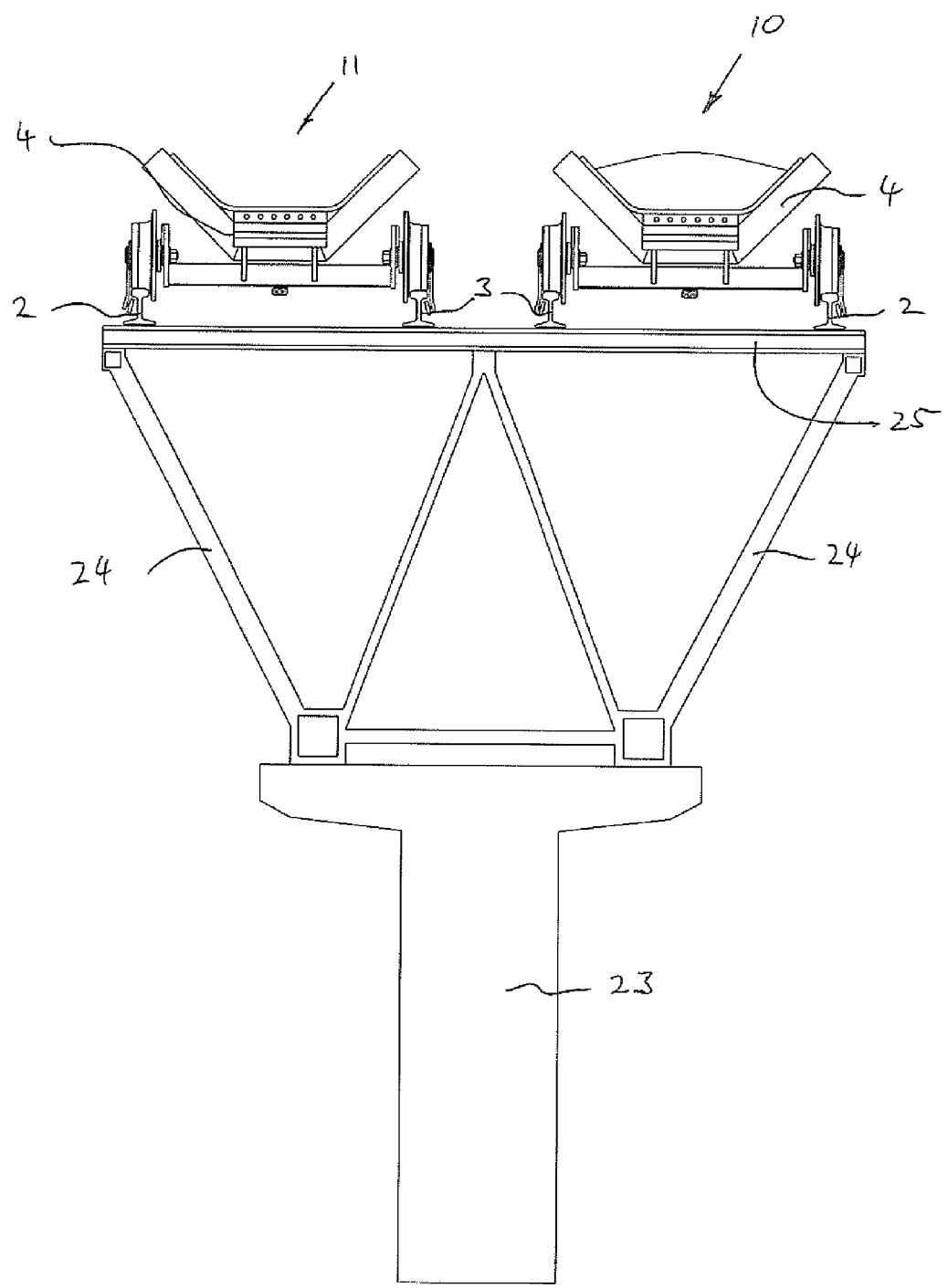
FIG. 17 is a cross sectional view through a conveying run and return run of the rail system using an elevated track.

Although it is possible to support the rails 2 and 3 in many different ways, for example by supporting the rails on spaced apart frames or on pylons as is common with conventional belt conveyors, one particularly cost effective method of constructing the conveyor is to locate the conveying run 10 side-by-side with the return run 11, as can be seen in FIG. 3, and supporting the two runs of rails on a set of common sleepers 12 in a manner similar to a convention railway system.

Where the terrain requires, the two runs of parallel rails may be elevated as shown in FIG. 17. In this configuration, a series of columns or pylons 23 may be erected supporting a truss configuration 24 to support a series of transverse cross beams 25 to take the place of the sleepers 12. The rails 2 and 3 are mounted on the cross beams 25 as before to support the carriages 4 for both the conveying run 10 and the return run 11.

Figure 18:
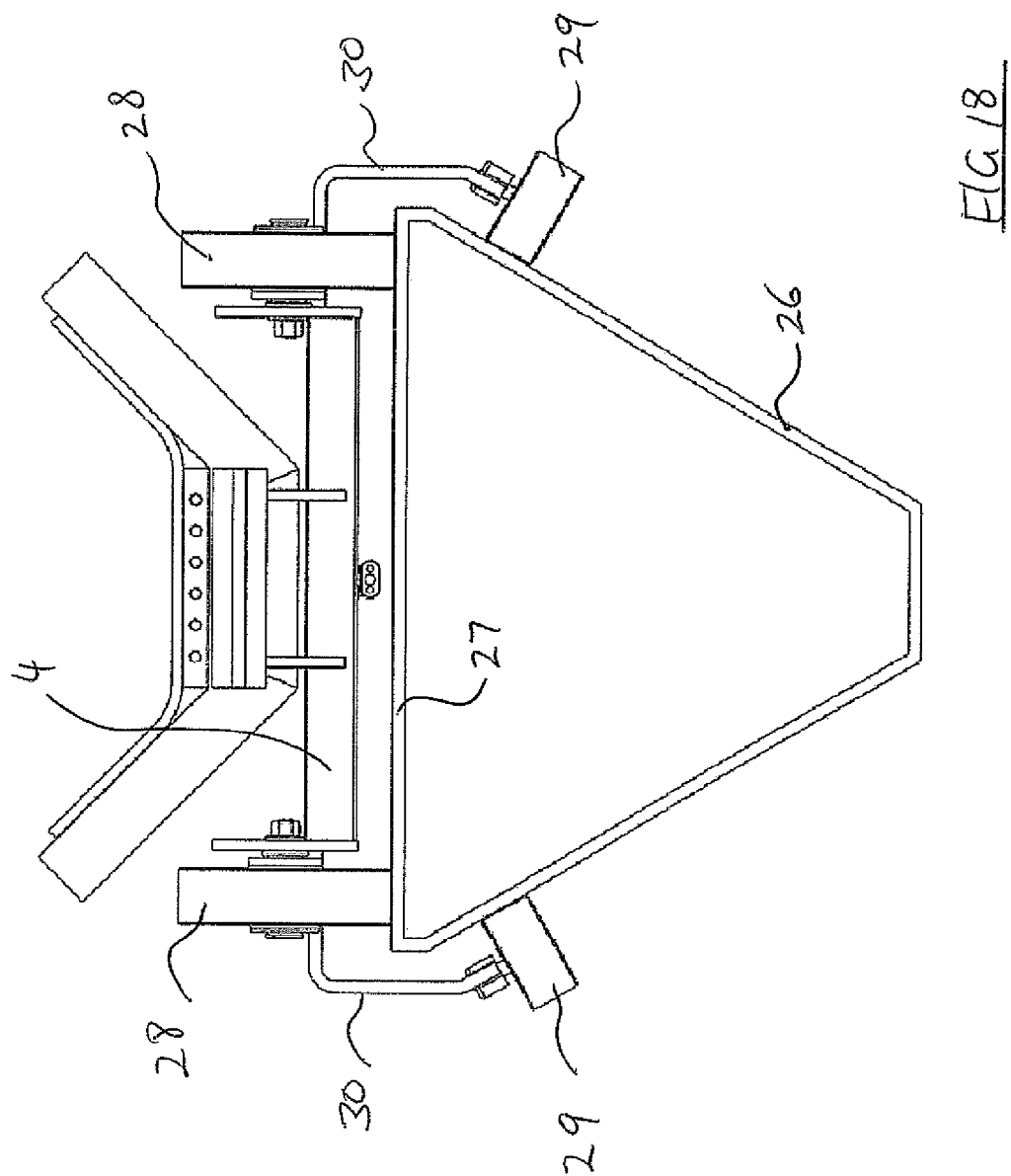
FIG. 18 is a similar view to FIG. 17 but showing the use of a monorail support track.

It is also possible to support the carriages on a monorail type construction as can be seen in FIG. 18 which shows a box section monorail 26 having a flat upper surface 27 on which flat profile wheels 28 run, in turn supporting the carriage 4. The wheels 28 may be provided with polyurethane lagging or rubber tyres as is common in monorail construction and each carriage may be kept in place on top of the monorail section by idler guide wheels 29 supported by struts 30 depending downwardly from the carriage 4. The monorail section 26 may be supported in any desired manner, but typically by way of columns or posts as shown at 23 for the configuration in FIG. 17.

Figure 4:
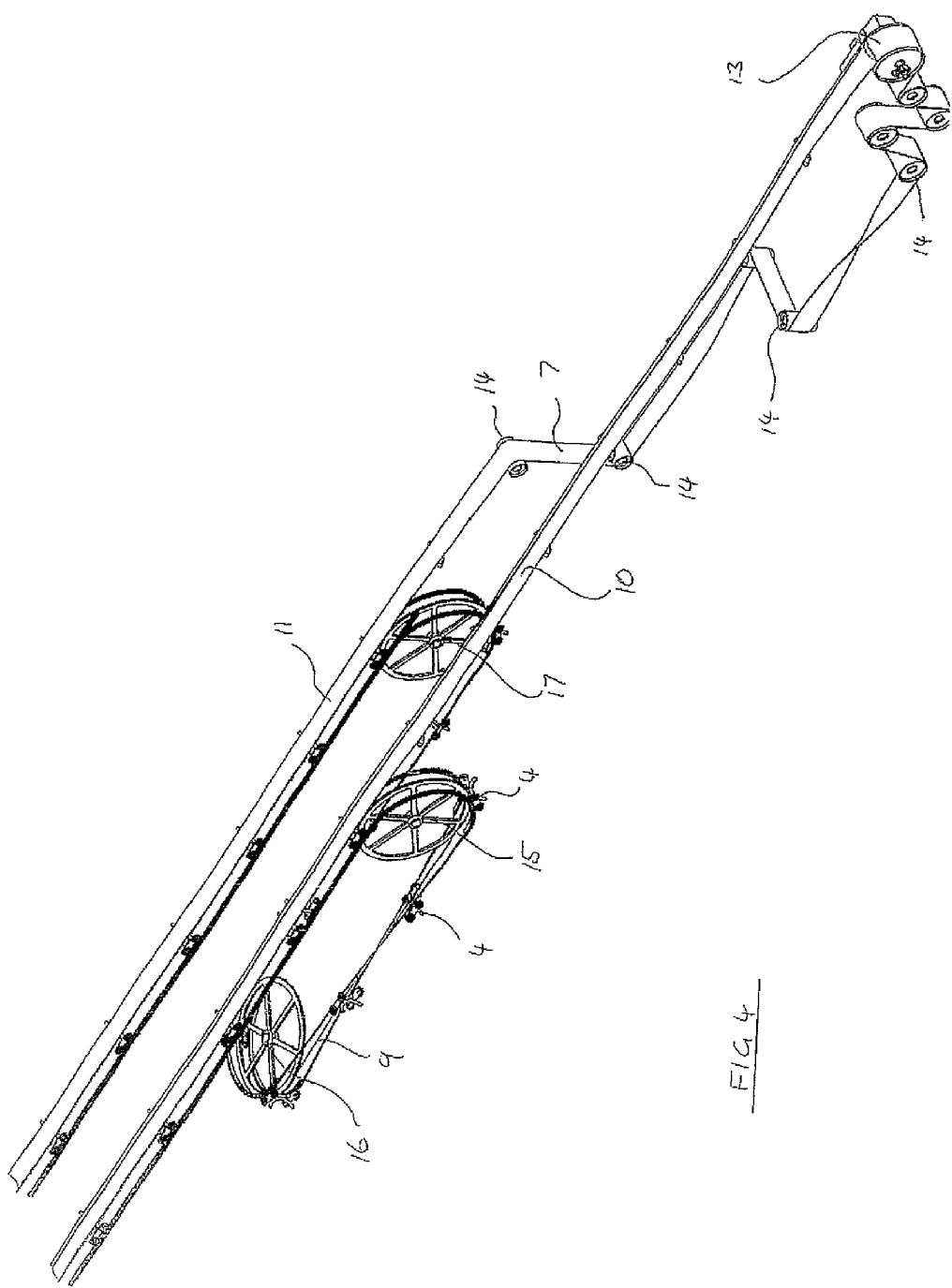
FIG. 4 is a diagrammatic perspective view of a drive and tensioning system used in the rail conveyor system according to the invention.

There are many different ways of driving and tensioning the rail conveyor system according to the invention but one way is shown in FIG. 4 where the conveying run of belt 10 terminates at a conventional belt conveyor drive and discharge point 13 where the belt is entrained over a series of directing and tensioning pulleys 14 before being redirected into the return run 11.

The belt is separated from the carriages 4 as the belt passes over a large drive pulley 15 where the driving rope 9 and the carriages 4 are inverted around the vertical drive pulley 15 while the conveying run 10 of the carry belt 7 continues to the discharge point 13.

The inverted carriages and the driving rope 9 are then passed around a horizontal drive pulley 16 and returned to the underside of a vertical tensioning pulley 17 where the carriages are returned to an upright position beneath the return run of the carry belt 11.

In this manner the driving rope 9 is able to be driven and tensioned by the set of pulleys 15, 16, 17 while the carry belt 7 is independently taken to conveyor belt drive and discharge point 13 and redirected and tensioned by the series of pulleys 14.

In a simpler form of the invention, typically suited for use over shorter distances, the rope 9 may serve to simply connect the carriages and the carriages may be driven by tension in the conveyor belt 7 driven in a more conventional manner.

Where the rail conveyor system is intended to operate over long distances, it is possible to use distributed drive systems which will allow use of a single carry belt with no need for bulk material transfer points. This can be achieved by the use of multiple drive stations, similar in principle to that shown in FIG. 4, but with the conveying run of the belt being redirected in the direction of the travel after the drive station. Alternatively, this can be achieved by positioning linear electrical drives at distributed distances along the run of the conveyor belt. Two conductor plates are typically attached to each support carriage i.e. one on each side of the wire rope, and a linear electric motor is used to provide propulsive force to the conductor plates in the manner well-known for linear electrical drives.

In systems of this nature, it is also desirable to use wire rope dynamic tension monitoring to integrate into the electrical control system for the distributed drive systems.

Figure 5:
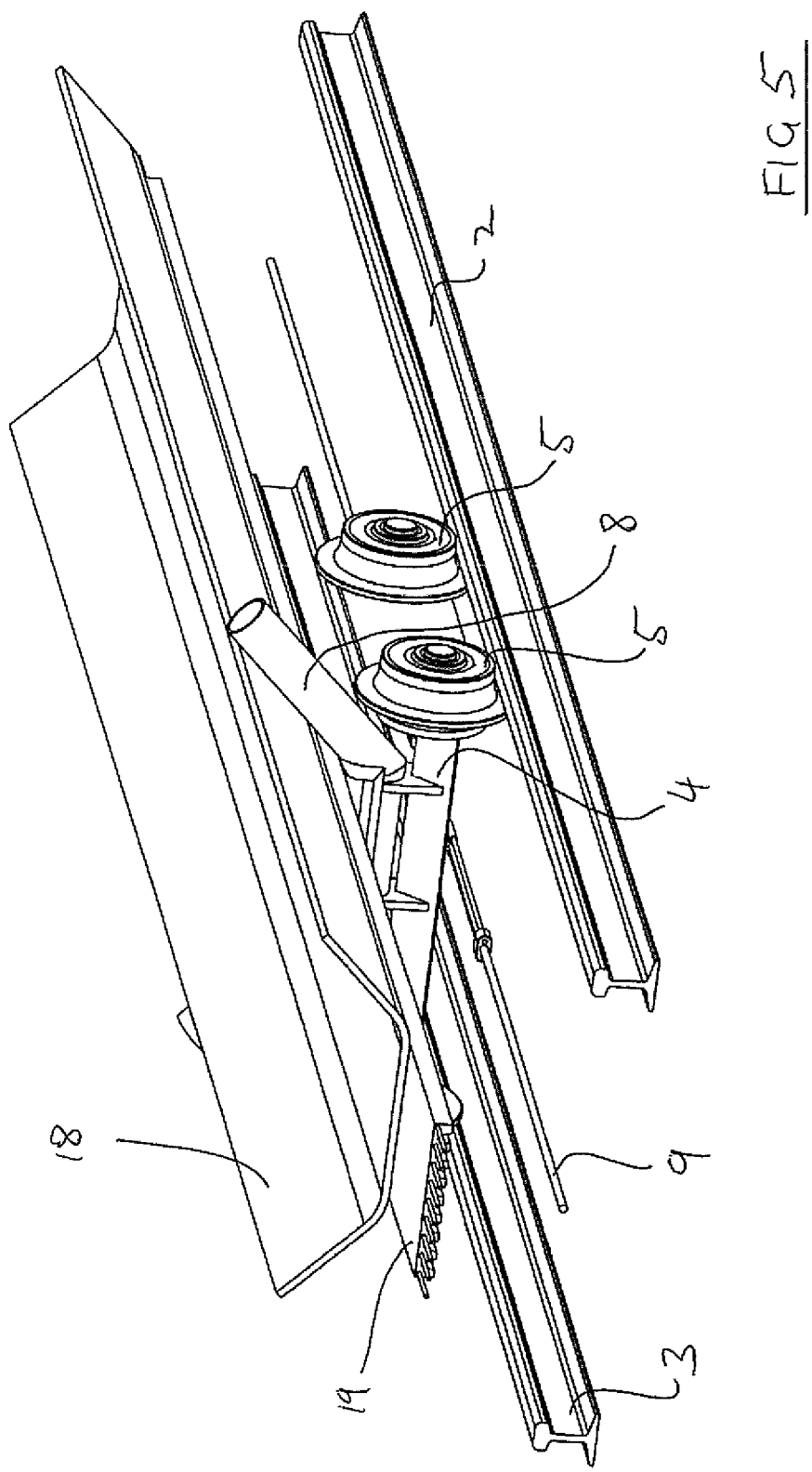
FIG. 5 is a diagrammatic perspective view of an alternative form of the invention utilising drive belt technology.
Figure 6:
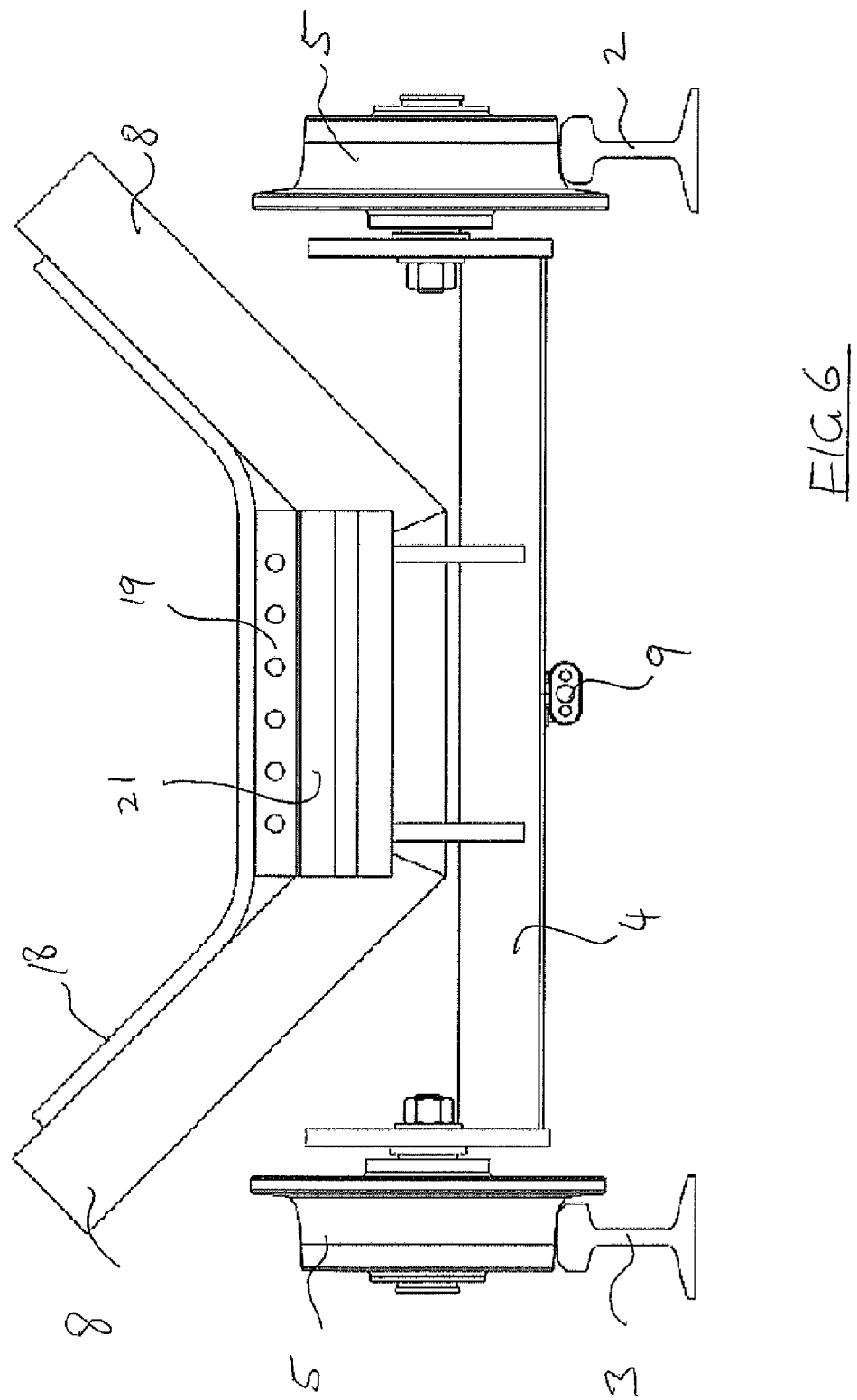
FIG. 6 is a diagrammatic end view of a carriage and conveyor belt as shown in FIG. 5.

In an alternative form of distributed drive system, drive belt technology can be used to deliver the driving force to the carry belt via a second high strength drive belt as can be seen in FIGS. 5 and 6. The drive belt can be powered or driven at multiple points along the length of the conveyor as will be described later with reference to FIG. 16. The carry belt 18 can be a relatively lightweight conventional fabric belt which is driven by friction from the drive belt 19 located beneath the centre portion of the carry belt 18.

The carry belt is supported on yolks 8 mounted on each carriage 4 which is supported on wheels 5 running on rails 2 and 3 as previously described.

The drive belt 19 is used to drive the system by friction between the drive belt and the carriage 4, rather than by tension in the wire rope 9.

This friction may be enhanced by a pad 21 on each carriage that in turn supports the drive belt. The pad 21 is typically curved on its top surface in the direction of travel and made from material chosen to enhance friction with the drive belt. The pad reduces belt indentation pressure on the drive belt by increasing the area of contact and therefore the surface area.

The wire rope 9 is normally retained, but only used to maintain the carriage spacing when the drive belt is being driven. In an alternative version, the rope 9 may be omitted altogether.

Figure 13:
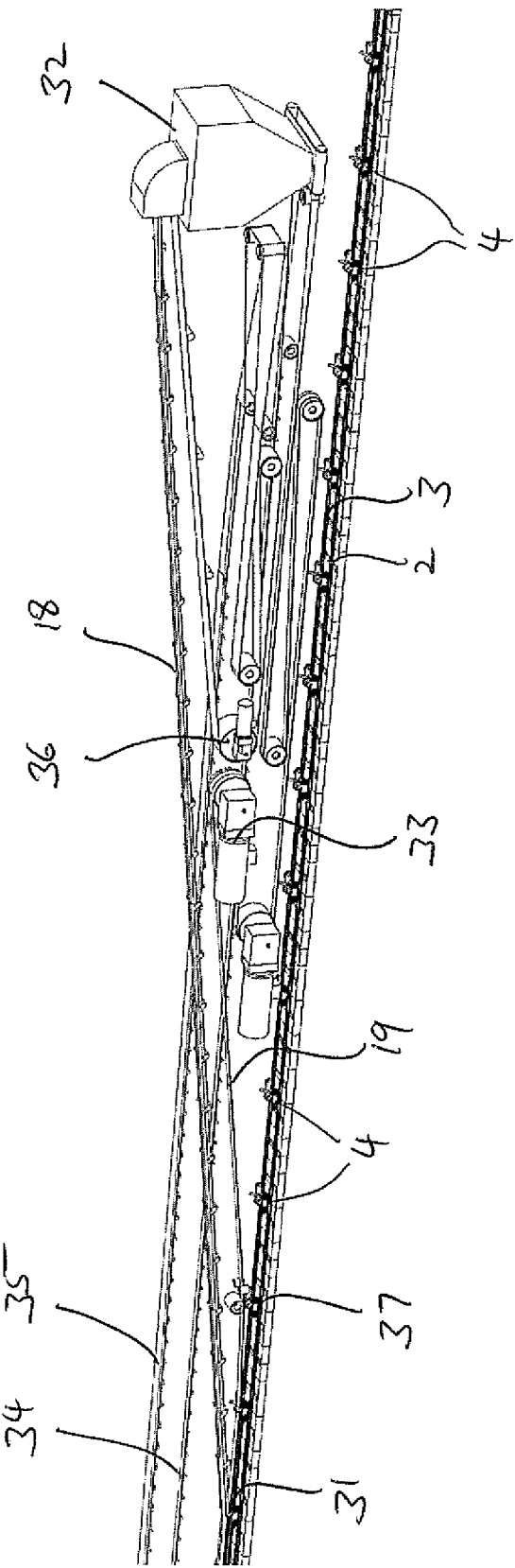
FIG. 13 is a diagrammatic perspective view of a head drive layout for use with a drive belt system.

When using a drive belt system, an alternative head drive layout may be deployed as shown in FIG. 13 where the carry belt 18 is lifted from the drive belt 19 at point 31 and elevated progressively on idler rollers to a discharge hopper 32.

The drive belt 19 is then entrained over a drive and tensioning mechanism 33 before being returned to a return portion 34 where it is reunited with the carry belt return portion 35 at a point downstream as will be described further below.

The carry belt 18 is returned from the discharge hopper 32 and entrained over a series of tensioning and drive pulleys 36 before being returned to return run 35 to be reunited with the drive belt 34.

Figure 12:
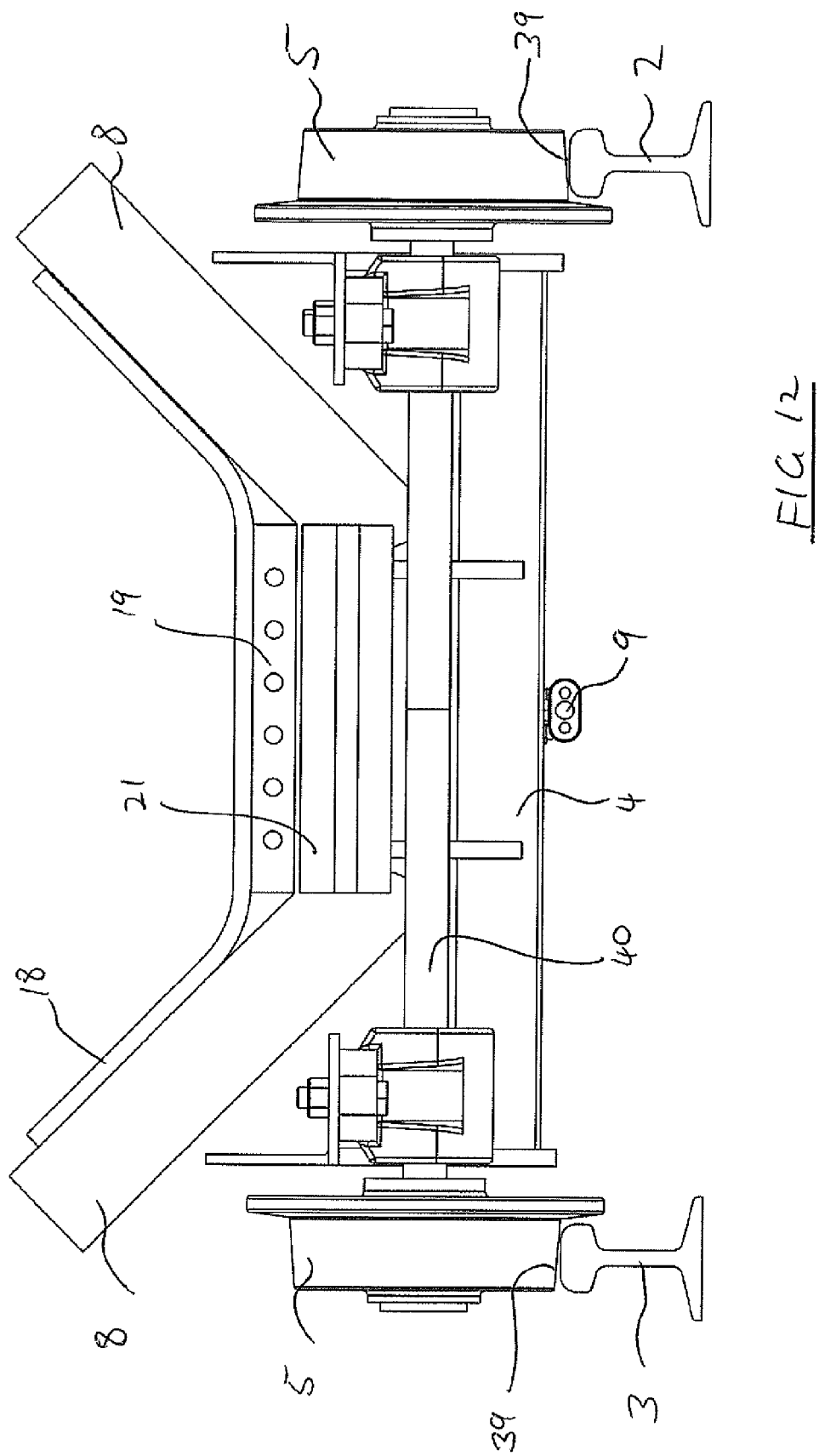
FIG. 12 is a diagrammatic end view similar to FIG. 6 but showing the use of a live axle between the two wheels in the carriage.
Figure 14:
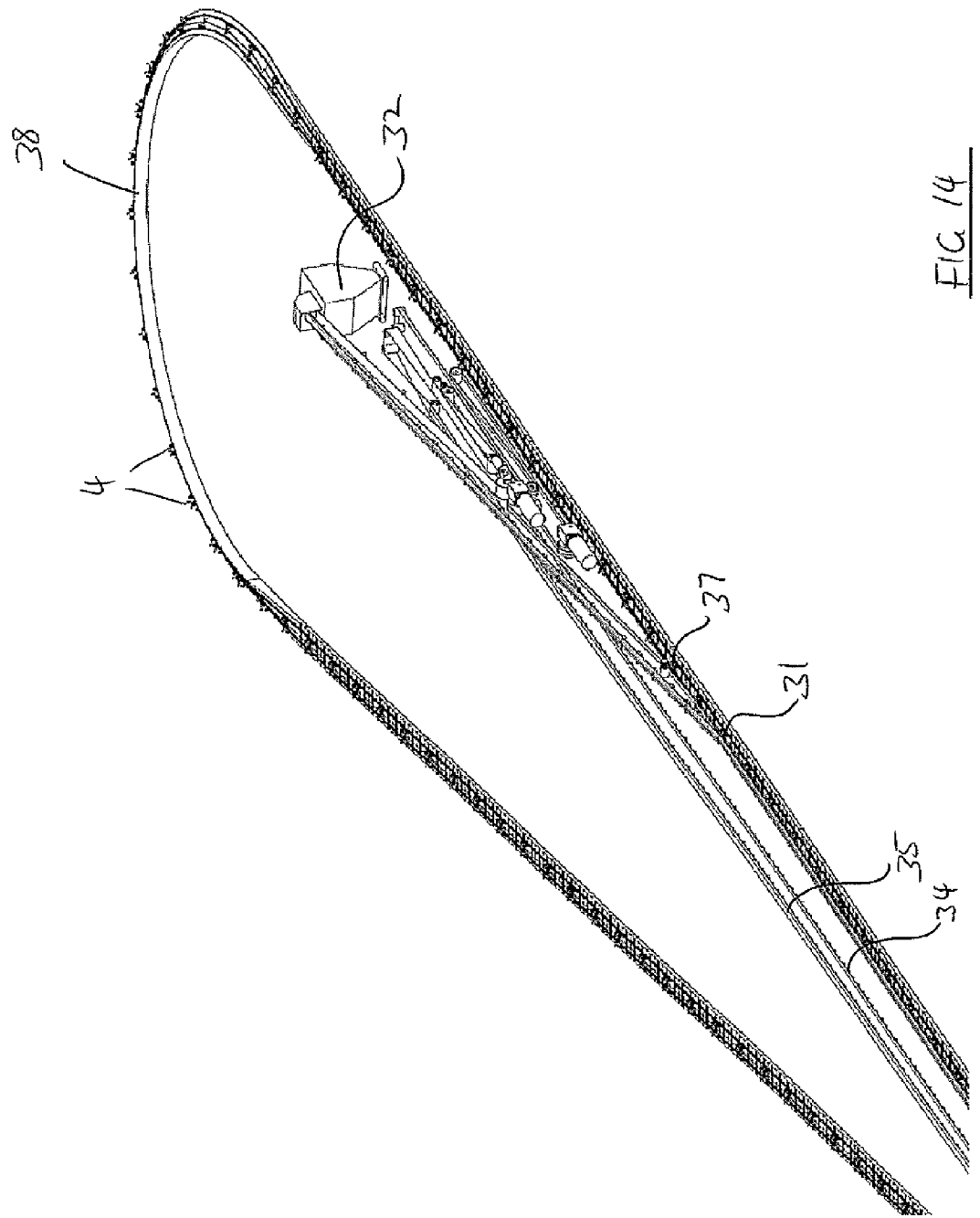
FIG. 14 is a diagrammatic perspective view of the head drive layout shown in FIG. 13 in combination with a return loop for the carriages.

Meanwhile, the carriages 4 which are released from both the drive belt and the carry belt at point 37 proceed along the rail track 2, 3, to return loop 38 as can be seen in FIG. 14. The advantage of this layout is that it is relatively simple and inexpensive to create the tensioning and drive mechanism using this configuration, and further more the return path for the carriages 4 is considerably simplified.

Where thought desirable to control any possible "crabbing" of the carriages throughout the system, it is possible to provide each carriage with a live axle configuration as can be seen in FIG. 12. In this configuration, the wheels 5 are provided with a tapered wheel profile as can be clearly seen at 39 where they rest on the rails 2 and 3 so that the diameter of the wheel increases as it rides up the rail profile in a manner well known in conventional rail technology. Because the wheels 5 are rigidly connected by a live axle 40 in this configuration, they are restrained to rotate at the same speed and this in combination with the tapered profile 39 controls any crabbing movement of the carriages.

Figure 16:
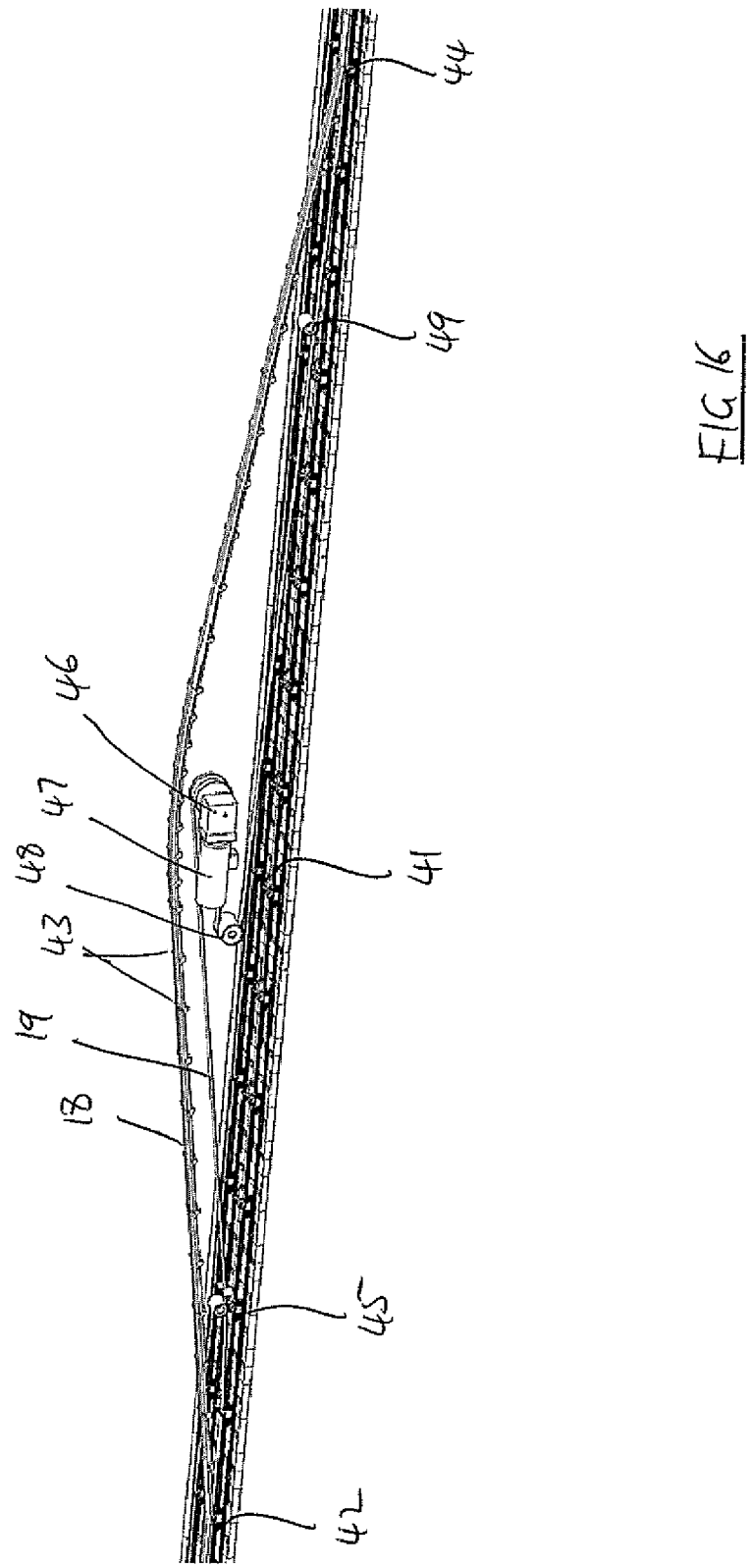
FIG. 16 is a diagrammatic perspective view of a distributed drive system for use with the drive belt embodiment.

Using the drive belt configuration, also makes is easier to incorporate distributed drive points along the length of the conveyor as shown in FIG. 16. In this configuration, the side-by-side rail tracks are provided as before at 41 guiding the carriages 4. At an appropriate point 42, the carry belt 18 is lifted from the carriages and guided over a set of idler rollers shown typically at 43 to be returned to the carriages at point 44.

The drive belt 19 is then elevated from the carriages at point 45 and fed to an intermediate drive station 46 where an interim drive motor 47 is used to further drive the drive belt 19 before it is returned around idler roller 48, under idler roller 49 to be reunited with the carriages at point 44.

Figure 15:
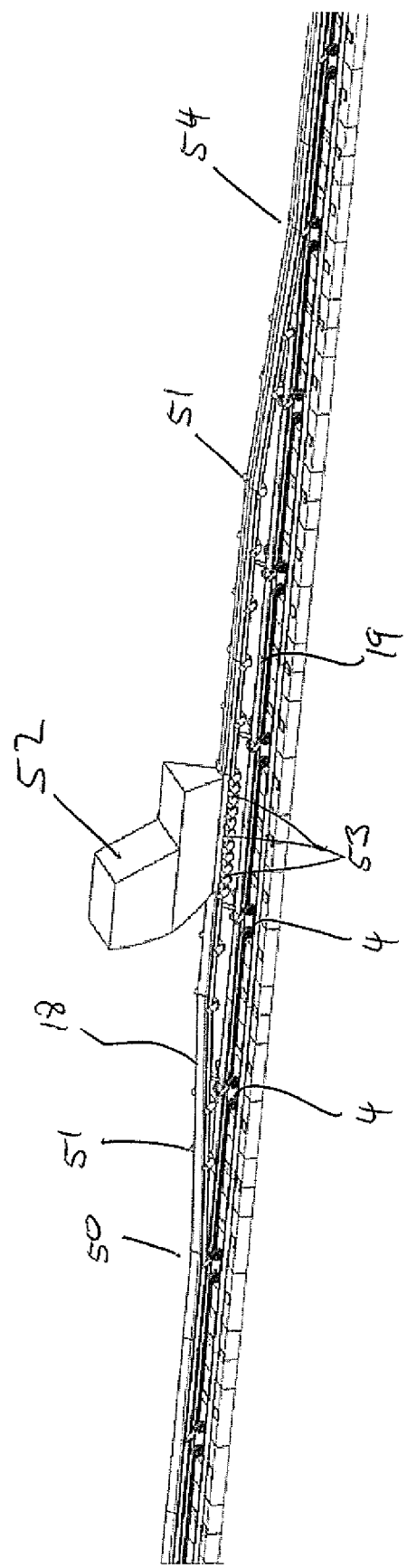
FIG. 15 is diagrammatic perspective view of a loading chute arrangement.

Because the carry belt 18 is relatively unsupported in spans between the carriages 4, it is also desirable to provide interim support at a loading point where bulk material impacts upon the carry belt 18 as can be seen in FIG. 15. In this configuration, the carry belt 18 is lifted from the carriages at point 50 and passed over a series of idler rollers 51. A loading chute shown diagrammatically at 52 is positioned above the elevated carry belt and a series of closely spaced idler rollers 53 are then provided beneath the loading chute in order to support the carry belt 18 as evenly as possible under the impact of load falling through the loading chute 52. The carry belt is then returned to sit on top of the drive belt 19 and the carriages 4 at point 54.

Figure 19:
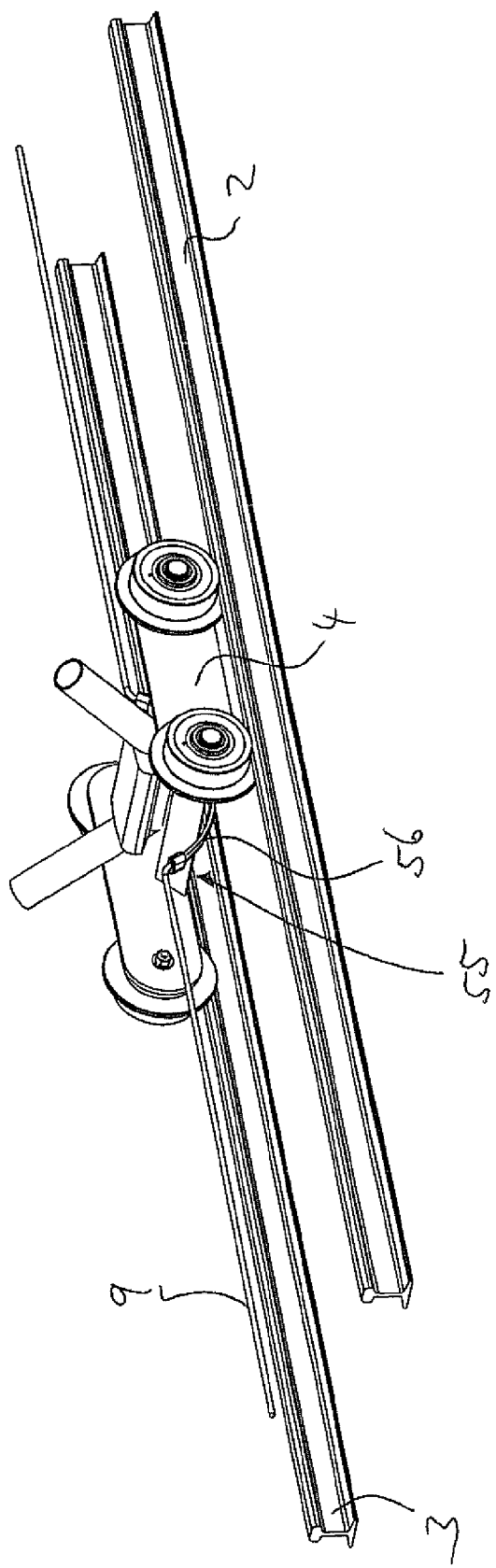
FIG. 19 is a diagrammatic perspective view similar to FIG. 5 with the carry belt omitted for clarity, showing the use of a wire rope tensioning system beneath each carriage.

As the carriages 4 progress around the return loop 38 (FIG. 14) it may be necessary to provide take up in the wire rope 9 in order to maintain tension in the system and give some flexibility to spacing between the carriages. This can be accommodated as can be shown in FIG. 19 by a wire rope tensioning system 55 in the form of a leaf spring or similar 56 to tension the rope 9 as it passes beneath each carriage 4. In this manner, it is possible to maintain the desired tension in the spacing rope 9 without causing shunting or otherwise undesired movement of the carriages 4 on the return loop 38. It is also envisaged that the carriages 4 may not always be equispaced from one another in order to avoid harmonic build up in the rail system.

Figure 7:
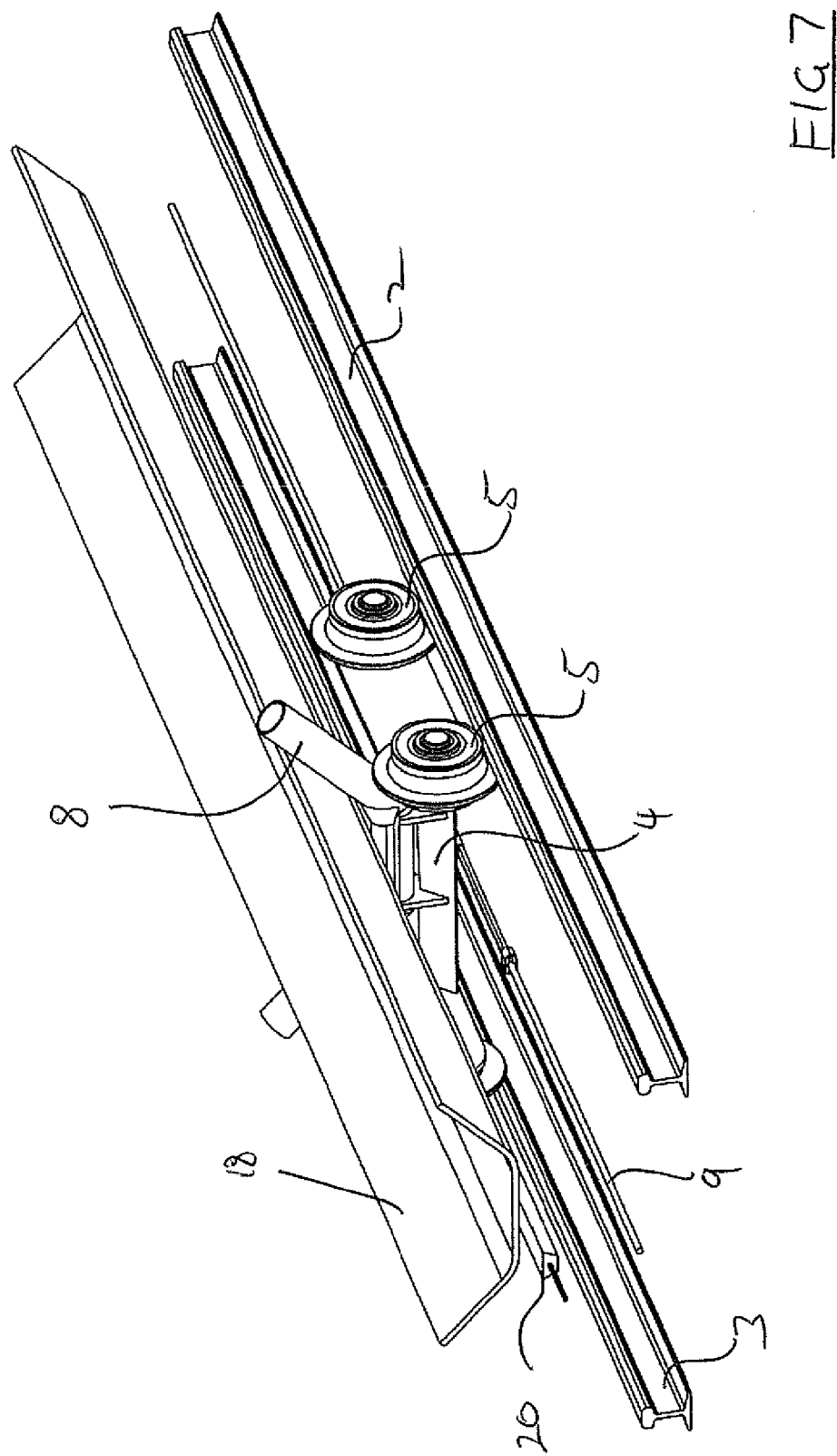
FIG. 7 is a diagrammatic perspective view of an alternative form of the invention using a V-belt as the drive belt.
Figure 8:
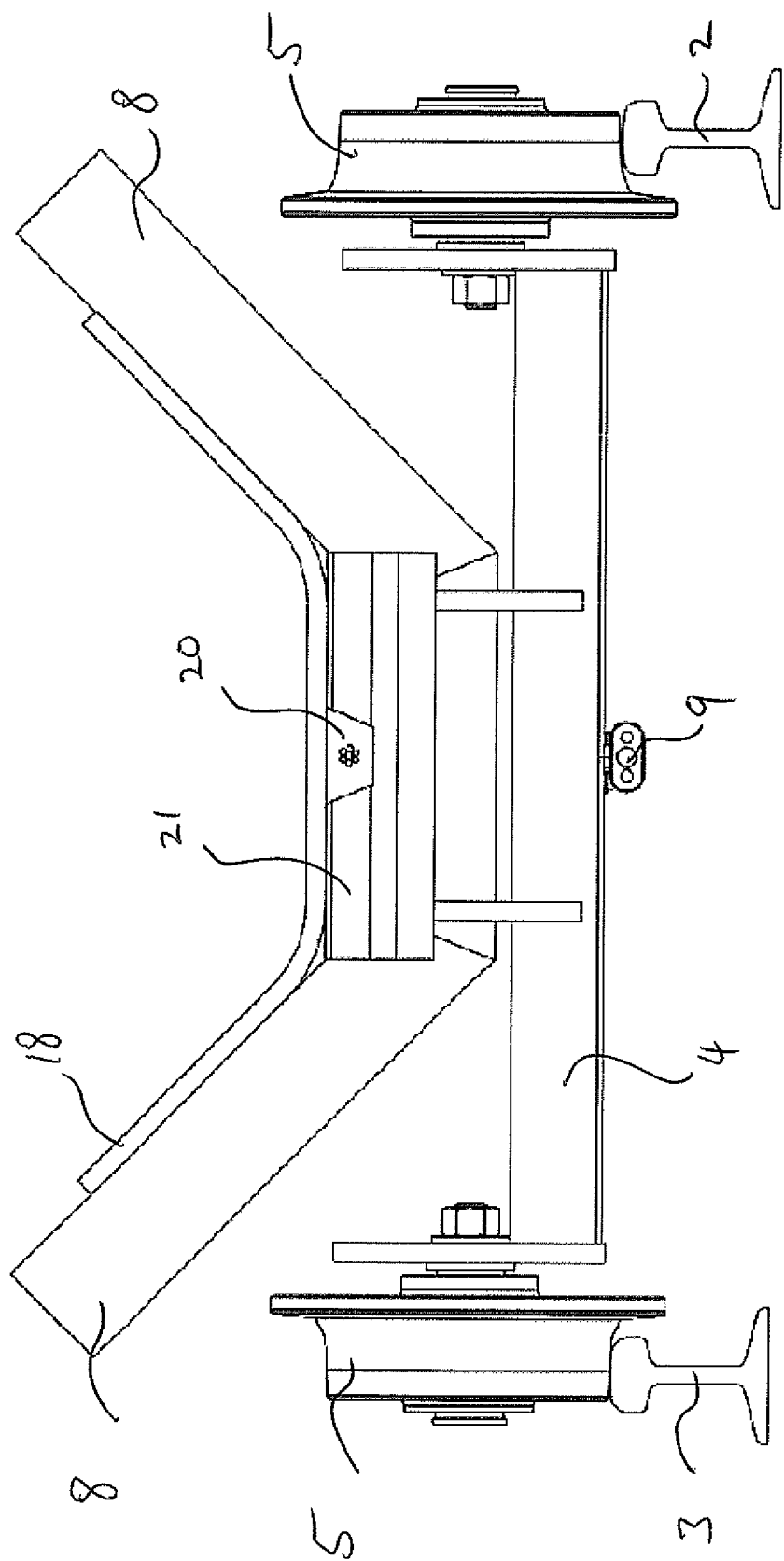
FIG. 8 is a diagrammatic end view of the configuration shown in FIG. 7.

An alternative form of the drive belt concept is to replace the drive belt with a potentially lower cost V-belt as shown in FIGS. 7 and 8. In this form the friction between the V-belt 20 and the belt support pad drives the carriages. Where desirable the drive traction can be increased by positioning the top surface of the V-belt slightly proud of the top surface of the belt support pad 21 as can be clearly seen in FIG. 8 so that the weight of the carry belt 18 acts to wedge the V-belt 20 into the pad 21.

Figure 11:
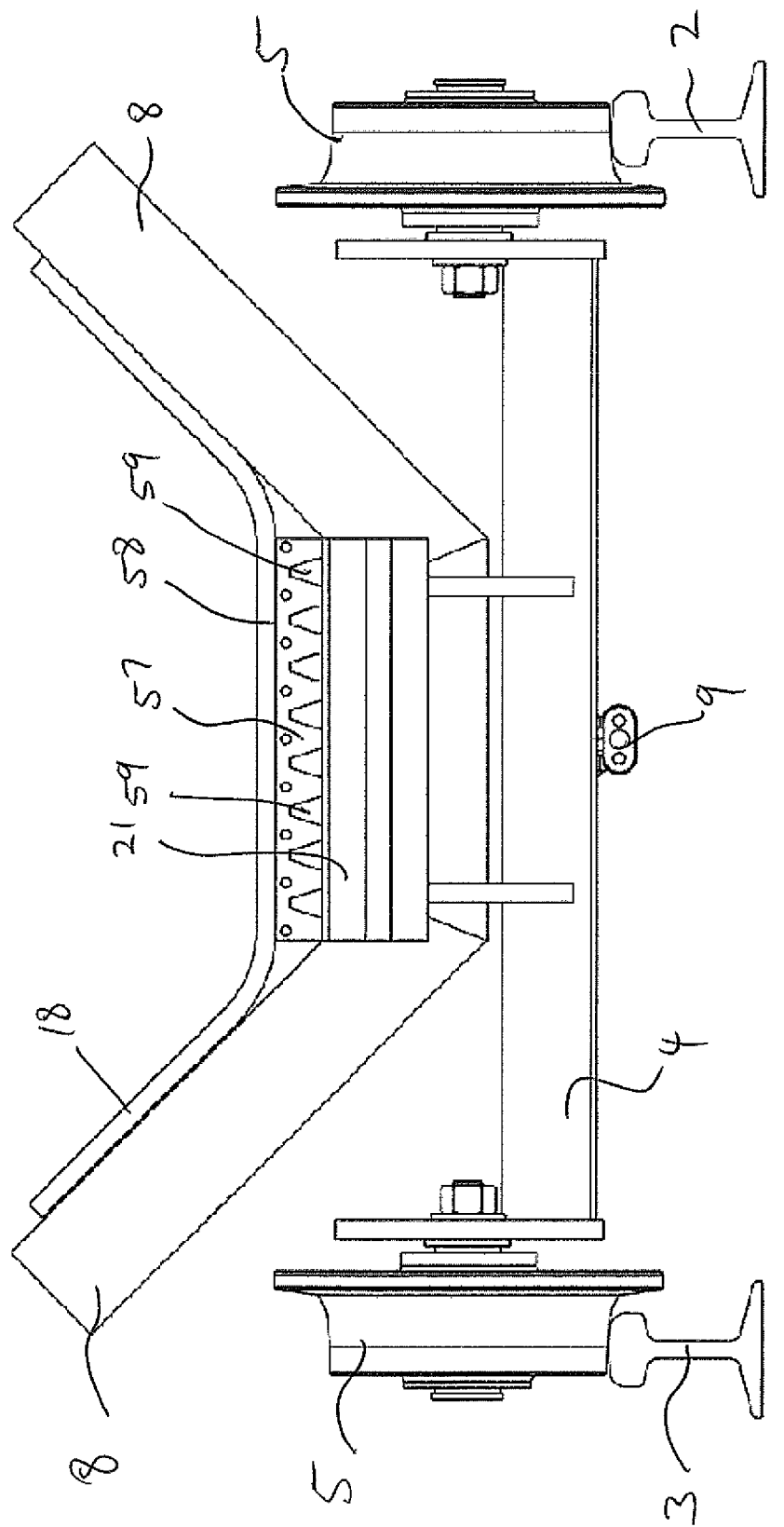
FIG. 11 is a diagrammatic end view similar to FIG. 8 but showing the use of a multiple V-belt as the drive belt.

It is also possible to use a multiple V-belt of the type shown at 57 in FIG. 11 where the carry belt 18 sits on top of the multiple V-belt 57 at interface 58 and is driven by friction between the carry belt 18 and the multiple V-belt as before. This configuration has the advantage that there are many wedge-type interfaces between the V-belt 57 and ribbed projections 59 on the carriage which will give enhanced grip between the V-belt and each carriage, as well as providing a larger friction interface area 58 between the multiple V-belt 57 and the carry belt 18. The multiple V-belt also enables more power to be transmitted to the belt without slipping at the head drive or distributed drive stations.

Figure 9:
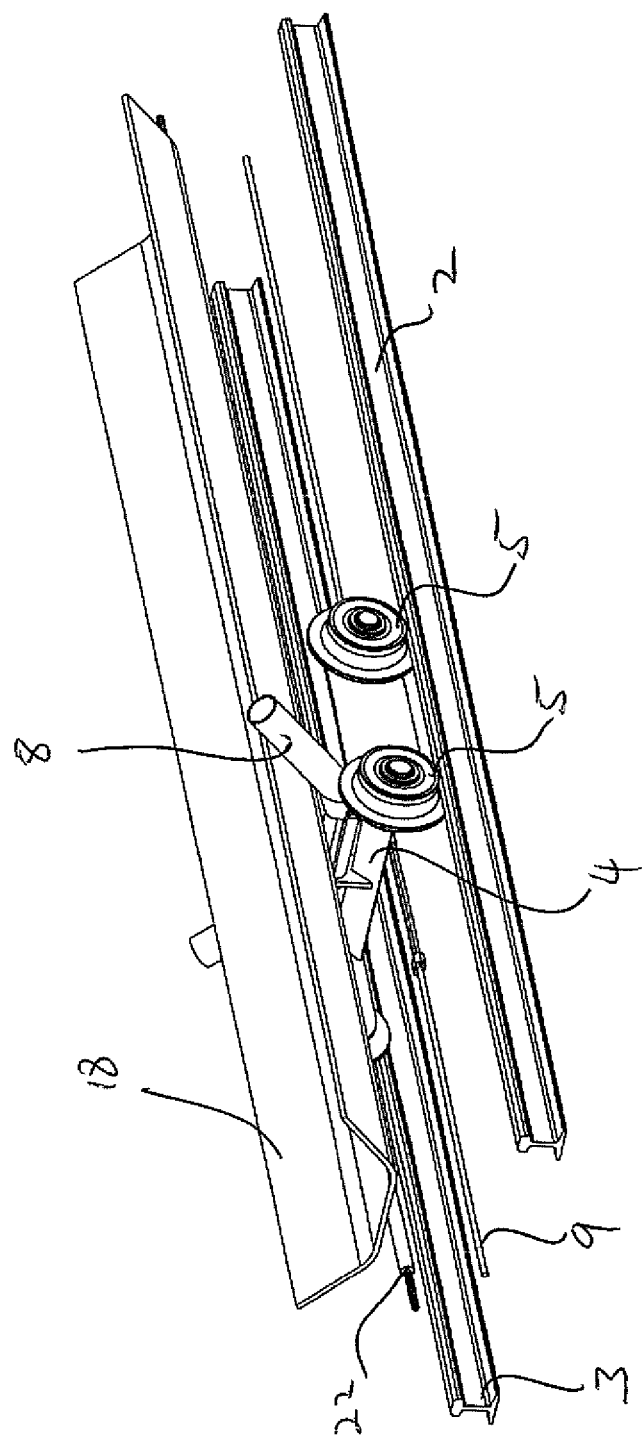
FIG. 9 is a diagrammatic perspective view of an alternative form of the invention using a wire rope as the drive belt.
Figure 10:
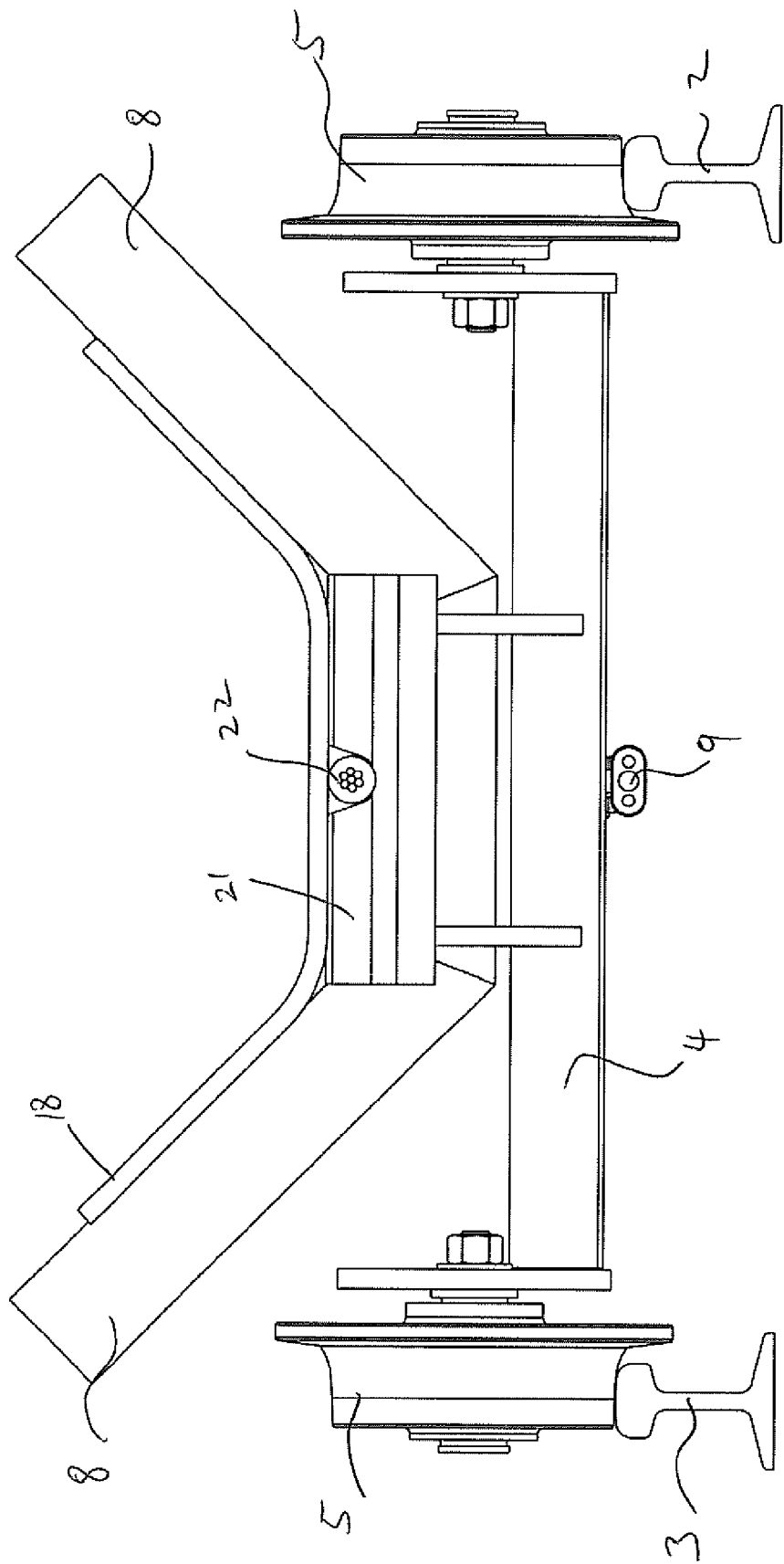
FIG. 10 is a diagrammatic end view of the configuration shown in FIG. 9.

In a still further alternative form of the invention as can be seen in FIGS. 9 and 10, a second wire rope 22 is utilised to drive the carriages. While this is the simplest form of the invention it may be difficult to provide sufficient drive traction between the belt support and the wire rope 22. The traction may be able to be enhanced by the use of high friction liners, wire coatings etc., or by positioning the wire rope 22 slightly proud of the top surface of the belt support pad 21.

In many ways, the belt drive technology is superior over both the linear electric drives and the centralised head drive systems described above in delivering maximum available power to the system. Additionally, the drive belt technology is proven and does not rely on the complexity of turning carriages through 90° at the head and tail ends of the conveying system as seen in the version shown in FIG. 14. The carriages will follow a continuous path, turning around horizontal loops at the head and tail ends of the system as shown in FIG. 14 in a similar manner to conventional railways, thereby greatly reducing the complexity of the drive stations.

A rail conveyor system according to the invention has many advantages over conventional long distance belt conveyors.

Firstly and primarily, the efficiency of the system is significantly increased by the reduction in friction between the belt and the rollers which exists in a conventional conveyor belt system. The rolling resistance of belt conveyors comprises the indentation rolling resistance due to the interaction between the belt and the idler rollers, belt and bulk material flexure resistance due to the movement between successive idler roller sets, and rotational resistance of the idler rollers due to bearings and seals. Much of this resistance is overcome using the rail conveyor system according to the invention by the use of steel wheels 5 running on steel tracks 2 and 3 which have a significantly lower rolling resistance.

In this manner, the rail conveyor system according to the invention combines the primary advantages of both belt conveyors and railway systems. The rail conveyor system is a continuous bulk material transportation system that due to the steel track wheels running on steel rails shares a rolling resistance similar in magnitude to railway systems while providing all the continuous delivery advantages of conventional belt conveyor systems.

Further advantages of the rail conveyor system over conventional conveyor belts include lower energy consumption and therefore lower emissions of particulates, $NO_x$ and $CO_2$, and also potentially lower capital costs due to the ability to use a lower strength belt compared with conventional long distance belt driven conveyors.

The rail conveyor system also gives the option of using a distributed drive system to reduce loadings on many components in the system, more flexible routing of the conveyor including smaller radius horizontal curves, quieter operation, ease of maintenance and monitoring, and the ability to operate the system more efficiently in low temperatures.

The invention claimed is:

1. A rail conveyor system comprising a rail track, a plurality of carriages spaced apart from one another and connected together by a flexible rope arranged to provide tension and variable spacing between the carriages and wherein the carriages are arranged to run on wheels supported by the track, there being at least three wheels on each carriage with two or more of said wheels spaced apart in the intended direction of travel such that each carriage is independently supported on the track, and a continuous carry belt supported by the carriages.

2. The rail conveyor system of claim 1, wherein each carriage has four wheels arranged in two pairs with each pair of wheels being spaced apart in said intended direction of travel.

3. The rail conveyor system of claim 1, wherein the track is a steel rail track.

4. The rail conveyor system of claim 3, wherein the wheels are steel wheels arranged to run on the track.

5. The rail conveyor system of claim 4, wherein the steel wheels are flanged and engage with pairs of rails in a similar manner to a conventional railway system.

6. The rail conveyor system of claim 5, wherein pairs of steel wheels in each carriage are connected by a live axle.

7. The rail conveyor system of claim 1, wherein the rope is a driving rope, driven by drive means to pull the carriages along the track.

8. The rail conveyor system of claim 1, wherein the continuous carry belt is driven by one or more drive belts.

9. The rail conveyor system of claim 8, wherein the continuous carry belt sits upon the, or each, drive belt and is driven by friction between the drive belt and the continuous carry belt.

10. The rail conveyor system of claim 8, wherein the drive belt comprises a V-belt.

11. The rail conveyor system of claim 10, wherein the V-belt comprises a multiple V-belt.

12. The rail conveyor system of claim 8, wherein the drive belt comprises a wire rope.

13. The rail conveyor system of claim 8, wherein the, or each, drive belt is driven by distributed drive stations spaced at intervals along the length of the track.

14. The rail conveyor system of claim 1, wherein the track comprises a monorail track and wherein idler rollers depending downwardly from each carriage engage the side of the monorail track.

15. A rail conveyor system comprising:
a rail track;
a plurality of carriages spaced apart from one another and connected together by a flexible rope arranged to provide tension and variable spacing between the carriages and wherein the carriages are arranged to run on wheels supported by the track, there being at least three wheels on each carriage with two or more of said wheels spaced apart in the intended direction of travel such that each carriage is independently supported on the track, and
a continuous carry belt supported by the carriages,
wherein the continuous carry belt is not fixed to the carriages but is driven directly or indirectly by friction surfaces between the carry belt and the carriages.

16. A rail conveyor system comprising:
a rail track;
a plurality of carriages spaced apart from one another and connected together by a flexible rope arranged to provide tension and variable spacing between the carriages and wherein the carriages are arranged to run on wheels supported by the track, there being at least three wheels on each carriage with two or more of said wheels spaced apart in the intended direction of travel such that each carriage is independently supported on the track, and
a continuous carry belt supported by the carriages,
wherein the carry belt is lifted from the carriages at a head drive station, allowing material to be discharged from the carry belt while the carriages are directed around a return loop before being reunited with the carry belt.

* * * * *